2,867,563

PHENYL MERCURY COMPOUNDS

David M. Musser, Fairlawn, and Ralph Zoccolillo, Ridgewood, N. J., assignors to Refined Products Corporation, Lyndhurst, N. J., a corporation of New Jersey No Drawing. Application July 27, 1954
Serial No. 446,144

3 Claims. (Cl. 167—30)

This invention relates to an improvement in mercury compounds for use as germicides, bactericides, fungicides and the like. Mercury compounds are used as germicides, fungicides and the like in many fields and, particularly, for the treatment of textiles, paper, leather and rubber, in plastic coating compositions, soaps, cosmetics, agricultural sprays, and the like, to render said compounds germicidal, bactericidal and fungicidal.

Considerable difficulty is encountered in producing mercury compounds suitable for use in these fields because of the insolubility of various mercury compounds, and especially because of the tendency of these compounds to separate out of solution on storage. Mercury compounds of this type are ordinarily sold in solution, with the intention that the solutions be further diluted in the various applications of the product, such as the application to textiles, in paper or other industrial fields, or for agricultural sprays before the compositions are used.

It is essential that these mercury solutions should not precipitate mercury or other solids during storage or upon initial dilution for use in the various fields in which such compounds are used. The precipitation of mercury or other solids from such mercury compounds not only reduces the effective strength of the final compound, but, in the event of precipitation in the bottles or other containers in which the solution is stored prior to use, the application of the product to such materials as textiles becomes difficult, because the solid content must be removed. Precipitation in the bottle often leads to such objections that the product is frequently returned to the manufacturer.

It is the object of our invention to provide a phenyl mercury compound which has a satisfactory storage or shelf life, and which will not precipitate in the bottles or other containers in which the product is stored.

Another object of the invention is to provide a phenyl mercury compound having germicidal, bactericidal and fungicidal activity, which may be readily applied to textile fabrics, paper, trees and plants in agricultural applications and in other fields, and which will not readily leach or wash out of the base to which it is applied.

Another object of the invention is to provide a phenyl mercury compound from which the mercury is rapidly deposited on textiles, trees, shrubs and the like, in a form in which it is more resistant to leaching and weathering than other forms of mercurial germicides.

Another object of the invention is to provide a phenyl mercury composition with a greater solubility for the phenyl mercury than ammonia, ammonium salts or amines, now commonly used, and from which the mercury compound can be more readily deposited with less tendency toward leaching and solubility in its deposited state.

Various other objects and advantages of our invention will be apparent as this description proceeds.

In preparing the phenyl mercury compound which is the object of this invention, we prefer to use the following materials in approximately the proportions given in parts or percentages by weight:

4.9 parts phenyl mercuric acetate
10.5 parts lactic acid (80%)
15 to 45 parts of water
69.6 to 39.6 parts monoethyl ether of ethylene glycol (sold under the trademark "Cellosolve")

In the above composition, the ratio of ingredients is important, particularly with reference to the amount of water. If the concentration of the phenyl mercuric acetate and lactic acid is held constant, then the concentration of water may vary from 15 to 45 parts with a corresponding change in the concentration of the monoethyl ether of ethylene glycol.

If more than 45 parts, or less than 15 parts, of water are used, the resulting solution soon becomes cloudy and unstable on storage, with ultimate objectionable precipitation.

Similarly, if the concentration of the phenyl mercuric acetate is increased above 4.9 parts or 4.9%, the solubility decreases and on storage the phenyl mercuric acetate will deposit out.

The concentration of the lactic acid is not so critical and may be varied within some limits. The ratio of lactic acid to phenyl mercuric acetate in the above formula is 6:1 on a molar basis. This ratio favors the formation of phenyl mercuric lactate in the equilibrium reaction between phenyl mercuric acetate and lactic acid. An excess of lactic acid also helps to maintain an acid pH, even on high dilutions of the compound for textile, agricultural and other applications. An acid pH of the application solution is desirable to promote rapid deposition and adherence of the mercury compound to textiles, paper, agricultural objects such as trees, shrubs and plants, and other materials to which these compounds may be applied. The excess of lactic acid and the acid condition of the compound tends to lower the solubility of the mercury compound in the dilute solutions used for application of the compound and, therefore, tends to deposit the mercury compound more readily from the dilute solutions used. Phenyl mercury compounds which have been solubilized on the acid side, when deposited on the material being treated, are more resistant to leaching, washing and weathering than mercury compounds which have been solubilized with ammonia, ammonium salts or amines and deposited on textiles, paper, plants and the like.

The monoethyl ether of ethylene glycol ("Cellosolve") has substantial advantages over other organic solvents for use in the above described composition. It has a boiling point of 135° C. and a relatively low vapor pressure, which contributes toward depositing the mercury compounds faster from solution upon evaporation and drying, and also has better solvent properties which facilitates the penetration of the mercury compound, particularly when applied to textiles which contain sizing or finishes.

For example, in the application of the above compound to apple trees to prevent or destroy apple scab, the above-noted compound was found to have the property of depositing the mercury compound rapidly and in a form such that it is more resistant to leaching and weathering than other mercury compounds solubilized with ammonia, ammonium salts or amines. It is therefore possible to use lower concentrations of the mercury compound in the final spray and still impart the same or better effectiveness as a fungicide than mercury compounds which tend to leach rapidly from the trees. The ability to use smaller amounts of the mercury compound and still secure effective control of the apple scab or other material to be controlled also reduces the likelihood of causing burns or damage to the fruit or trees to which the compound is applied, such as sometimes happens with the use of stronger mercury compounds.

The phenyl mercury compound produced by the use of "Cellosolve" also is more effective as a fungicide than phenyl mercury compounds which have been solubilized by the use of ammonia, ammonium salts or amines. For example, phenyl mercuric lactate amine compounds require more drastic conditions, such as longer exposures or higher temperatures, to make the compounds leachproof and weatherproof, whereas phenyl mercury compounds solubilized with "Cellosolve" are deposited more rapidly and are more resistant to removal. The reason for this may be that phenyl mercuric lactate forms a chemical compound with ammonia and amines and, therefore, retains its solubility longer, when applied to textiles or as a spray on trees or shrubs, whereas phenyl mercuric lactate, solubilized with "Cellosolve" cannot form a chemical compound with the "Cellosolve" and so loses its solubility when sprayed or applied to textiles, immediately on evaporation of the solvent, and therefore deposits readily and, being less soluble, remains firmly adherent to the base to which it is applied. The acid pH of the final dilute application solution produced by the use of the above composition also contributes greater permanency to the deposited mercury compound, as the mercury compound, once deposited, is not as soluble as mercury compounds deposited from alkaline solutions.

*Example*

As one illustrative example of the method of producing the compound described above, 4.9 parts of phenyl mercuric acetate is dissolved by warming and stirring in a solution containing 63.9 parts of "Cellosolve" (monoethyl ether of ethylene glycol), 10.5 parts of 80% lactic acid and 20.7 parts of water. The solution is cooled and filtered to remove any undissolved and foreign matter. The solution so prepared is stable on storage and will not deposit mercury or other solid material under normal storage conditions, and will contain 2.9% of mercury.

It will be understood that other compositions within the range above-noted may be made according to the principles of this example and that various other modifications and changes may be made from the specific example given, without departing from the spirit of this invention or the scope of the following claims.

We claim:

1. As a composition of matter, a phenyl mercury compound adapted for shipment in the following concentrations and dilution and application in solution to various materials, consisting initially of 4.9 parts by weight of phenyl mercuric acetate, approximately 10.5 parts by weight of lactic acid (80% strength), between 15 and 45 parts by weight of water and between 69.6 and 39.6 parts by weight of monoethyl ether of ethylene glycol, said compound having an acid pH.

2. A composition of matter containing approximately the following proportions of ingredients: 4.9 parts by weight of phenyl mercuric acetate, 10.5 parts by weight of lactic acid (80% strength), 15 to 45 parts by weight of water and 69.6 to 39.6 parts by weight of monoethyl ether of ethylene glycol.

3. A diluted solution of the composition of claim 2 plus a diluent for application to textiles, paper, trees, shrubs and the like.

References Cited in the file of this patent

UNITED STATES PATENTS 2,418,986     Rampel                 Apr. 15, 1947
2,479,275     Sowa                   Aug. 16, 1949

OTHER REFERENCES

Chem. Abst., page 6495(h), 1951, vol. 45.
Loeffler et al.: J. Econ. Ent., 39, pp. 589–597 (1946).
Reddish: "Antiseptics, Disinfectants, Fungicides and Sterilization," 1954, p. 233.